(12) United States Patent
Agrawal et al.

(10) Patent No.: US 12,490,193 B2
(45) Date of Patent: Dec. 2, 2025

(54) CONTROL OF STATES OF A WIRELESS DEVICE FOR CONNECTION TO A SATELLITE NETWORK

(71) Applicant: Skylo Technologies, Inc., Mountain View, CA (US)

(72) Inventors: Meghna Agrawal, Cupertino, CA (US); Soham Dhiren Desai, Palo Alto, CA (US); Andrew Nuttall, Mountain View, CA (US)

(73) Assignee: Skylo Technologies, Inc., Mountain View, CA (US)

( * ) Notice: Subject to any disclaimer, the term of this patent is extended or adjusted under 35 U.S.C. 154(b) by 397 days.

(21) Appl. No.: 18/201,935

(22) Filed: May 25, 2023

(65) Prior Publication Data

US 2024/0397427 A1 Nov. 28, 2024

(51) Int. Cl.
*H04W 52/02* (2009.01)
*H04W 76/28* (2018.01)
*H04W 76/38* (2018.01)

(52) U.S. Cl.
CPC ....... *H04W 52/0241* (2013.01); *H04W 76/28* (2018.02); *H04W 76/38* (2018.02)

(58) Field of Classification Search
CPC . H04W 52/0241; H04W 76/28; H04W 76/38; H04W 76/27; H04B 7/18513
See application file for complete search history.

(56) References Cited

U.S. PATENT DOCUMENTS

| | | |
|---|---|---|
| 5,592,173 A | 1/1997 | Lau et al. |
| 12,124,317 B1 * | 10/2024 | Skukkestad ............. G06F 3/017 |
| 2011/0241827 A1 | 10/2011 | Varoglu |
| 2011/0299506 A1 | 12/2011 | Ferguson |
| 2014/0148158 A1 * | 5/2014 | Cho ...................... H04W 28/14 455/435.1 |
| 2017/0171808 A1 | 6/2017 | Bishop et al. |
| 2024/0085568 A1 * | 3/2024 | Tang ..................... G01S 5/0009 |
| 2024/0107263 A1 * | 3/2024 | Balasubramanian ........ H04W 76/14 |
| 2024/0171962 A1 * | 5/2024 | Li ........................ H04W 68/02 |
| 2024/0206002 A1 * | 6/2024 | Khirallah ............... H04W 48/18 |
| 2025/0071730 A1 * | 2/2025 | Wu ....................... H04W 68/02 |
| 2025/0185100 A1 * | 6/2025 | Aoyagi ............. H04B 7/18539 |
| 2025/0219796 A1 * | 7/2025 | Khoshkholgh Dashtaki ............... H04W 76/27 |

OTHER PUBLICATIONS

5G; Non-Access-Stratum (NAS) protocol for 5G System (5GS); Stage 3, (3GPP TS 24.501 version 16.5.1 Release 16), Aug. 2020.

* cited by examiner

*Primary Examiner* — Edan Orgad
*Assistant Examiner* — Malick A Sohrab
(74) *Attorney, Agent, or Firm* — Brian R. Short

(57) ABSTRACT

Apparatuses, methods, and systems for managing an operational state of a wireless device that connects to a satellite wireless network are disclosed. One method includes supporting, by a base station, a wireless connection of the wireless device through a satellite to the satellite wireless network, determining that the wireless device is in a dormant state based on an indication that the wireless device supports the dormant state and based on signaling attempts to the wireless device, controlling, by the base station, information wirelessly communicated to the wireless device based on whether the wireless device is in the dormant state, and buffering of information for the wireless device based on whether the wireless device is in the dormant state.

26 Claims, 12 Drawing Sheets

CONTROL OF STATES OF A WIRELESS DEVICE FOR CONNECTION TO A SATELLITE NETWORK

FIELD OF THE DESCRIBED EMBODIMENTS

The described embodiments relate generally to wireless communications. More particularly, the described embodiments relate to systems, methods, and apparatuses for control of states of a wireless device for connection to a satellite network.

BACKGROUND

Satellite networks operate to cover large areas and can have a large number of users. Further, only limited amounts of spectral resources are allocated to satellite networks. Accordingly, satellite networks should be selective in allowing user access to the satellite networks.

It is desirable to have methods, apparatuses, and systems for control of states of a wireless device for connection to a satellite network.

SUMMARY

An embodiment includes a method for managing an operational state of a wireless device that connects to a satellite wireless network. The method includes supporting, by a base station, a wireless connection of the wireless device through a satellite to the satellite wireless network, determining that the wireless device is in a dormant state based on an indication that the wireless device supports the dormant state and based on signaling attempts to the wireless device, controlling, by the base station, information wirelessly communicated to the wireless device based on whether the wireless device is in the dormant state, and buffering of information for the wireless device based on whether the wireless device is in the dormant state.

Another embodiment includes a system for managing an operational state of a wireless device that connects to a satellite wireless network. For an embodiment, the system includes a configured to support a wireless connection of the wireless device through a satellite to the satellite wireless network, determine that the wireless device is in a dormant state based on an indication that the wireless device supports the dormant state and based on signaling attempts to the wireless device, control paging information wirelessly communicated to the wireless device based on whether the wireless device is in the dormant state, wherein control of buffering of information for the wireless device is additionally based on whether the wireless device is in the dormant state.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for control of states of a wireless device for connection to a satellite network.

Figure 1:
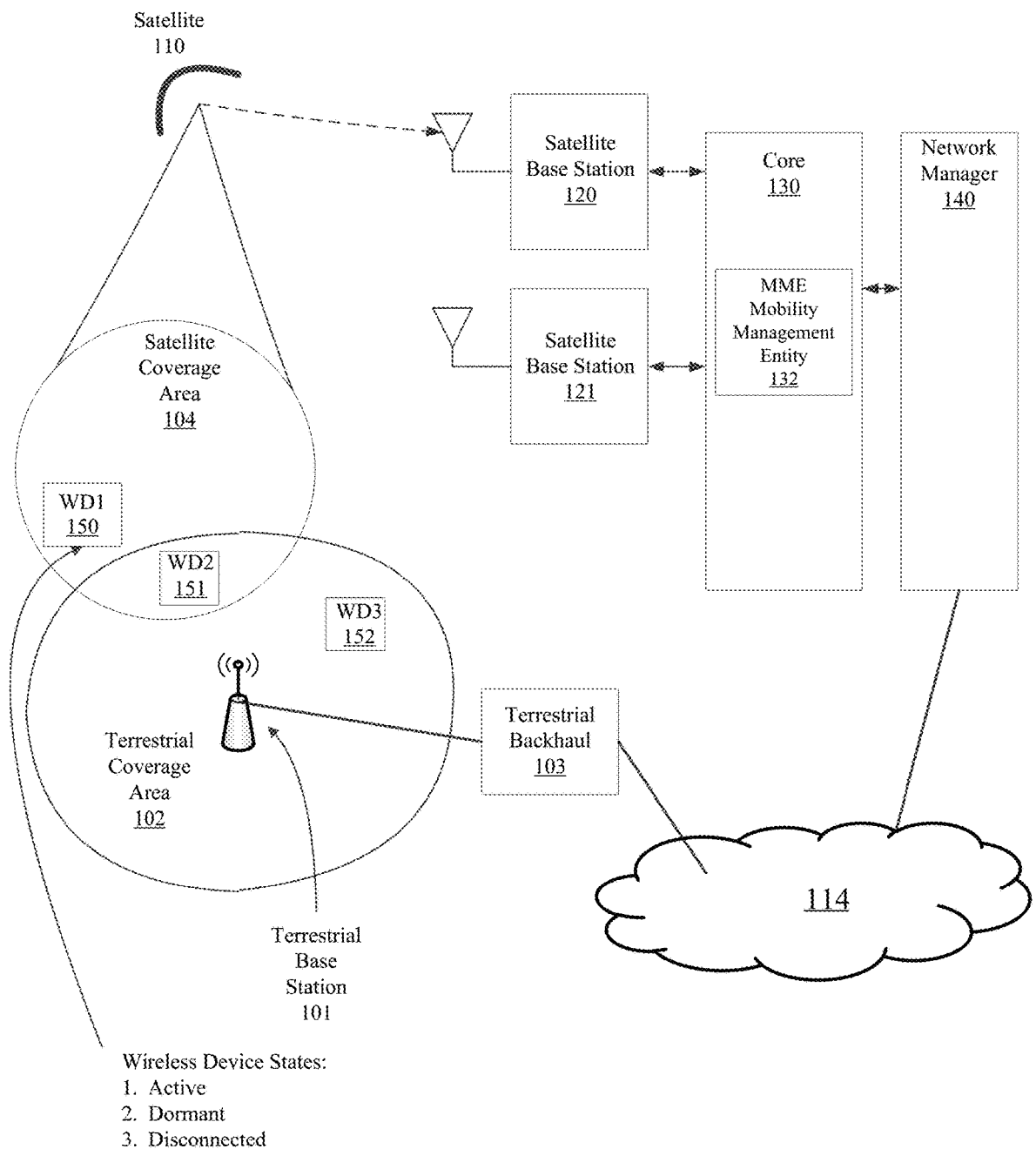
FIG. 1 shows a satellite network that includes a base station wirelessly communicating with wireless devices, according to an embodiment.

FIG. 1 shows a satellite network that includes a base station 120 wirelessly communicating with wireless devices 150, 151, according to an embodiment. As shown, the base station 120 wirelessly communicates with a wireless device 150 through a satellite 110. The wireless communication through the satellite includes a satellite coverage area 104, wherein the bases station 120 of the satellite network is operable to form a wireless link to the wireless device 150 when the wireless device 150 is within the satellite coverage area 104. Accordingly, in order for the wireless device 150 to wirelessly connect to any network, the wireless device 150 must wirelessly connect to the base station 120 of the wireless satellite network through the satellite 110.

As shown, the wireless device 151 is within the satellite coverage area 104 and within a terrestrial coverage area 102 of a terrestrial base station 101. Accordingly, wireless links can be formed between the wireless device 151 and the base station 120 of the wireless satellite network and between the wireless device 151 and the terrestrial base station 101 of a terrestrial network. Accordingly, the wireless device 151 can wirelessly connect to either the satellite wireless network through the base station 120, or the wireless device 151 can wirelessly connect to the terrestrial network through the terrestrial base station 101.

As shown, the wireless device 152 is located within the terrestrial coverage area 102, but not in the satellite coverage area 104. Accordingly, the wireless device 152 can only wirelessly connect to the terrestrial network through the terrestrial base station 101.

As shown, for an embodiment, the wireless network further includes a core 130 and a network manager 140. Further, the core 130 includes a mobility management entity (MME) 132. Further, the wireless satellite network further includes other base stations, such as, base station 121.

A terrestrial backhaul network 103 can connect the terrestrial base station 101 to a network 114. Further, the network manager may be connected to the network 114 as well.

For at least some embodiments, one or more of the mobile devices includes a dormant state, an active state, and a connected state.

Satellites have the capability to cover large areas and accordingly large numbers of devices may attempt to wirelessly connect to a wireless satellite network. Frequency spectrum becomes a valuable, scarce resource that must be conserved. The introduction of the dormant state conserves frequency spectrum because signaling between the satellite network and the wireless device can be reduced.

For an embodiment, the wireless device (such as, wireless device 150) supports the dormant state. For an embodiment, the wireless device being in the dormant state is indicated to the wireless satellite network or determined by the wireless satellite network. For an embodiment, the wireless satellite network determines the state of the wireless device through signaling of messages to the wireless device. For an embodiment, when establishing that the wireless device is in the dormant state, the wireless satellite network (such as, the base station) does not transmit wireless communication (such as, paging) to the wireless device, and further the satellite network operates to buffer information (data) for the wireless device while the wireless device is in the dormant state. Note that the wireless satellite network may also buffer data for the wireless device when the wireless device is in an active state (connected state), but that the wireless satellite network buffers more of the data for the wireless device when the wireless device is in the dormant state than when the wireless device is in the active state.

The described embodiments that include the three states (active state, dormant state, and disconnected state) operate to more efficiently utilize satellite channel (frequency spectrum) usage. More specifically, the introduction of the dormant state allows for a reduction of uplink and downlink signaling overheads that is needed for a two state (active state, disconnected state) satellite system. The described embodiments help in managing the wireless connection between the wireless devices and the satellite network, and further aid switching the wireless connection from the wireless device between the satellite network and a terrestrial network. With the inclusion of functionality of the dormant state, the wireless device avoids communicating with the base station that is normally included with a two-state solution. Therefore, the use of satellite resources (such as valuable frequency spectrum) is reduced. That is, the transition of the wireless device from the disconnected state to active state for transmitting or receiving data consumes more spectral resources compared to moving from dormant state to active state for transmitting or receiving data. The management of data exchange and transition from a non-terrestrial and the terrestrial networks is spectrally efficient with the introduction of the three states. Further, for an embodiment, when a satellite core network is aware that the wireless device is in dormant state, the satellite core network reduces that number of downlink messages that need to be sent to the wireless device which additionally saves satellite downlink channel resources.

Dormant State

For an embodiment, when operating in the dormant state, the wireless device does not follow a TAU (tracking area update) policy specified by the core 130 of the satellite wireless. Further, for an embodiment, when operating in the dormant state, the wireless device saves an attach context and network policies (including attach policies) specified by the core 130 of the satellite wireless network. For at least some embodiments, the policies are specified by core 130 during the attachment process of the wireless device. For at least some embodiments, the attach policies include one or more of timer values, negotiated DRX (Discontinuous reception) and DRX parameters, Tau transmission period. TAI list, or APN (access point name) information. For an embodiment, the wireless device is not following a standard TAU policy but instead preserves certain information (such as, timer value for periodic tau transmission, TAI list) related to an attachment of the wireless device to the wireless satellite network and the network policies that apply to the wireless device. Further, for an embodiment, when in the dormant state, the wireless device does not follow a PSM (power saving mode).

For an embodiment, when the wireless device is in the dormant state, the base station does not send messages to the wireless device. Further, for an embodiment, when the wireless device is in the dormant state, the base station 120, the core 130, and/or an application server buffer downlink data for the wireless device until the state of the wireless devices changes from the dormant state to an active state. Further, for an embodiment, when the wireless device is in the dormant state, the base station 120 maintains an RRC (radio resource connection) context of the wireless device. Further, for an embodiment, when the wireless device is in the dormant state, the base station 120 maintains the RRC context, but doesn't send paging requests.

For at least some embodiments, RRC context (connection setup) includes a connection establishment process between the base station of the wireless satellite network and the wireless device. A typical RRC connection establishment includes a prach (periodic random access channel also referred to as message 1) transmission by the wireless device. The base station responds with RAR (random access response, also referred to as message 2). The wireless device then sends (transmits) an RRC connection request message (referred as message 3), and the base station sends (transmits) an RRC connection setup message (also referred to as message 4) to the wireless device. The wireless device then responds with an RRC connection complete message (message 5) to the base station. As will be described, for some embodiments, the RRC connection setup message (also referred to as message 4) and the RRC connection complete message (message 5) may be eliminated when the wireless device is determined not to be activated.

For an embodiment, the wireless device may enter or exit the dormant state based upon the ephemeris information of the communication satellite(s) the network is using. Further, for an embodiment the wireless device may go into a dormant state when no satellites are available and may leave a dormant state when a satellite is available. For an embodiment, the wireless device knows this information apriori based on the ephemeris information of the satellite(s) and the physical location of the wireless device. For an embodiment the base station and core network similarly register a wireless device in the dormant state based upon the satellite ephemeris information and the location of the device. For an embodiment, when the wireless device leaves dormant state, the wireless device begins to scan for the satellite communication network signal over the air.

Active State

For an embodiment, when operating in the active state, the wireless device follows the TAU policy and other policies of the core 130 of the satellite wireless network. For an embodiment, the wireless device and the wireless satellite network (for example, a core of the wireless satellite network) both maintain an attach context while the wireless device is in the dormant state. For an embodiment, when the wireless device becomes active again, the wireless device can directly send data using a NAS (network attached storage) service request without any need of authentication and security exchange. For an embodiment, the attach context of the wireless device includes security keys, authentication and encryption algorithm. For an embodiment, while the wireless device is in dormant state, the wireless device also maintains the attach context. For an embodiment, maintaining the attach context allows for the avoidance of authentication and security while in the active state.

For an embodiment, multiple base stations using different satellites can share a common core network connection and communicate information about the context and security of the wireless device. For an embodiment, when a wireless device connects to a new base station, the wireless device switches from the dormant state to the active state and directly sends uplink data without the overhead of following authentication and security procedures again. Similarly, downlink data and signaling can be sent to the wireless device directly from the new base station.

For an embodiment, if a base station wirelessly communicating over satellites does not have a direct core connection, the base station can connect to other satellites and share the information about the wireless device context and security and route traffic using this inter satellite link.

Disconnected State

For an embodiment, when operating in the disconnected state, the wireless device does not maintain any communication with the wireless satellite network, and the wireless satellite network does not buffer any information for the wireless device.

Figure 2:
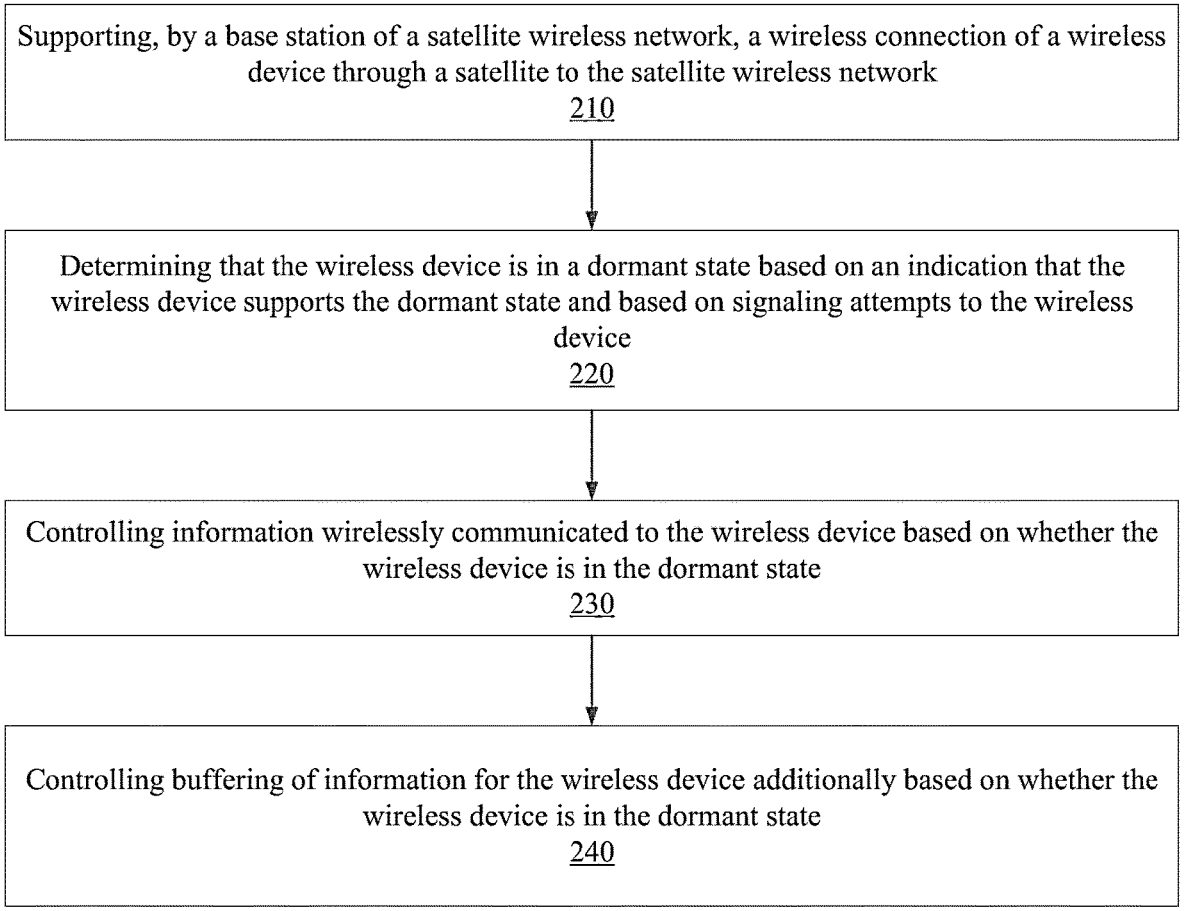
FIG. 2 is a flow chart that includes steps of a method for managing an operational state of a wireless device that connects to a satellite wireless network, according to an embodiment.

FIG. 2 is a flow chart that includes steps of a method for managing an operational state of a wireless device that connects to a satellite wireless network, according to an embodiment. A first step 210 includes supporting, by a base station, a wireless connection of the wireless device through a satellite to the satellite wireless network. A second step 220 includes determining that the wireless device is in a dormant state based on an indication that the wireless device supports the dormant state and based on signaling attempts to the wireless device. A third step 230 includes controlling, by the base station, information wirelessly communicated to the wireless device based on whether the wireless device is in the dormant state. A fourth step 240 includes buffering of information for the wireless device based on whether the wireless device is in the dormant state.

For an embodiment, the base station is further configured to maintain a current state of the wireless device, wherein the current state includes at least one of the dormant state or an active state.

For an embodiment, controlling information wirelessly communicated to the wireless device includes reduced sending of messages to the wireless device when the wireless device is in the dormant state. For an embodiment, the reduced sending can include not sending messages to the wireless device when the wireless device is in the dormant state. For an embodiment, the dormant state is an indication that no messages are to be exchanged with the wireless device. Hence, an NTN (non-terrestrial node) base station will not attempt to send any downlink messages via paging to the wireless device when the wireless device is in the dormant state.

For an embodiment, the wireless satellite network operates to buffer information or data for the wireless device when the wireless device is in the dormant state includes buffering downlink data for the wireless device until a state of the wireless devices changes from the dormant state to an active state. For an embodiment, data for the wireless device is buffered by the wireless satellite network for a longer period of time when the wireless device is in the dormant state than when the wireless device is in the active state. For example, when in the dormant state, the wireless satellite network may buffer data for the wireless device for a week, whereas when the wireless device is in the active state, the wireless satellite network may buffer data for the wireless device for only 10 seconds. That is, for an embodiment, the downlink buffering is for a longer period of time when the wireless device is in the dormant state than when the wireless device is not in the active state.

For an embodiment, the buffer(s) of the wireless satellite network have a maximum buffer size. The buffering of the wireless satellite network can be within the base station, and alternatively or additionally in the core of the wireless satellite network. For an embodiment, the maximum buffer size when the wireless device is in the dormant state can be based on the type of the wireless device, or an indicated priority of data traffic of the wireless device. For an embodiment, a server of the wireless satellite network indicates to the core of the satellite network the notification of downlink data for the wireless device but stores the data in buffers based on the knowledge that the wireless device is in the dormant state. For an embodiment, the base station also receives a notification from the core about the downlink data for the wireless device when the wireless device is in the dormant state, and the base station may store certain information in a buffer of the base station.

For an embodiment, the base station is further configured to inform an application server of the wireless satellite network when the current state of the wireless device changes. For an embodiment, the base station also informs the application server when the current state changes from dormant state to active state, or the dormant state to the active state. For an embodiment, the base station is further configured to inform the application server of the wireless satellite network when the current state of the wireless device changes states. For an embodiment, based on the indication from the base station, the server adjusts the buffer size and if an indication of the wireless device moving to active state is sent, wherein an application of the server starts sending data messages to the wireless device. For an embodiment, the application of the server includes multiple interfaces to connect with the wireless device for either the wireless satellite network or a terrestrial network. For an embodiment, the application of the server decides the interface for data transmission based on the state (active/dormant) of the wireless device as received from the base station.

For an embodiment, the base station is further configured to transition the wireless device to a disconnected state and purge downlink messages when buffering of information for the wireless device reaches the maximum size threshold. For an embodiment, the maximum size of the buffer(s) is adaptively selected based on a priority of the wireless device, a type of data, or network traffic.

For an embodiment, the current state of the wireless device is independently maintained on both the wireless device and the base station. For an embodiment, the wireless device updates the current state of the wireless device based upon sensor data of the wireless device. For an embodiment, the sensor data includes at least navigational satellite data of a GNSS sensor. For an embodiment, the wireless device transitions from the dormant state to the active state based on a received signal strength of signals received from GNSS satellites. For an embodiment, the wireless device transitions from the dormant state to the active state based on a received signal strength of signals received from GNSS satellites and a position of a satellite servicing the satellite network relative to the position of the wireless device and the GNSS satellites.

For an embodiment, the current state of the wireless device transitions from one state to another state based on interaction of the wireless device with a user of the wireless device. For an embodiment, the interactions are determined using motion sensors, or proximity sensors of the wireless device. For an embodiment, the wireless device transitions from the dormant state to the active state based on a received signal strength of signals received from satellites of the satellite network and signal received from a terrestrial network.

For an embodiment, the signaling attempts by the base station include at least one of paging attempts, downlink grants, or uplink grants to the wireless device. For an embodiment, the signaling includes the base station sending multiple signaling messages to the wireless device for operation. For an embodiment, the signaling includes sending the wireless device uplink grants if the wireless device is attempting to send uplink data. For an embodiment, the signaling includes sending the wireless device downlink grants when the wireless device needs to receive data from the wireless satellite network. For an embodiment, the signaling includes sending pages to the wireless device to wake the wireless device from the dormant state to a connected state. Prior solutions that do not include the dormant state typically purge an RRC (radio resource control) context when the wireless device does not respond to paging of the base station. However, at least some of the described embodiments include the base station retaining the RRC context when the wireless device is in the dormant state. That is, for an embodiment, the wireless satellite network is further configured to maintain the RRC context of the wireless device when the wireless device is determined to be in the dormant state. For an embodiment, the RRC includes one or more of a temporary identifier of the wireless device, capabilities of the wireless device, an RNTI (radio network temporary identifier of the wireless device, a base-core interface identifier dedicated for the wireless device. For a wireless device that does not respond to a threshold number of paging, the base station keeps the RRC context, but the base station may not send further paging requests to the wireless device while the wireless device is in dormant state. For an embodiment, when the wireless device is in the dormant state, the base station maintains the RRC context for the wireless device, but the base station does not send paging requests. Further, for an embodiment, when the wireless device is in the dormant state, the wireless satellite network maintains the attach context of the wireless device. For an embodiment, the attach context of the wireless device includes security keys, authentication and encryption algorithm. For an embodiment, while the wireless device is in dormant state, the wireless device also maintains the attach context.

For an embodiment, while the wireless device is in dormant state the wireless device is not proactively trying to receive wireless signals (pages) through a paging channel from the base station. For an embodiment, while the wireless device is in dormant state wireless device does not transmit periodic TAU (tracking area update) messages to the base station, and wireless device does send TAU messages while in an active state based on the TAU policy exchanged between satellite core network and wireless device. It is to be understood that the wireless device does send TAU messages to the base station while the wireless device is in the active state.

As previously described, for an embodiment, the indication of whether the wireless device supports the dormant state is received from the wireless device or a third party. For an embodiment, a wireless device sends signaling messages to the wireless satellite network that indicates whether the wireless device supports the NTN (non-terrestrial noded) or wireless satellite dormant state. For an embodiment, this indication is captured and analyzed by the base station to determine capabilities of the wireless device. For an embodiment, a user or a manufacturer of the wireless device provides the information into a third-party application or service that indicates whether the wireless device supports the NTN dormant state or not. For an embodiment, this is performed over the internet using cellular networks or WiFi.

For an embodiment, the third-party application automatically collects information about capabilities of the wireless device, including whether the wireless device supports the NTN dormant state or not. For an embodiment, this includes the application sending a query to the wireless device to retrieve its capabilities or by analyzing network signaling messages sent by the wireless device.

For an embodiment, when a user registers their wireless device with the third-party application or the wireless satellite network, the user provides information about the capabilities of the wireless device, including whether the wireless device supports the NTN dormant state or not.

For an embodiment, the wireless device also provides its capability to the wireless satellite network during a network attach process. For an embodiment, the capabilities are added as a field in the attach request message from wireless device to wireless satellite network). For an embodiment, the capabilities include whether the wireless device supports dormant state or not and the method used by device to move from active to dormant state. For an example, for an embodiment, the wireless device can move to the dormant state, without informing to base station. When the wireless device loses satellite signal strength (satellite signal strength is less than a threshold SINR for more than a threshold duration of time) or when wireless device moves to range of a terrestrial network.

For an embodiment, the base station is further configured to determine that the wireless device is in the dormant state, including identifying that the base station has missed a threshold number of paging requests from the wireless device. For an embodiment, the base station is configured to detect whether the wireless device is in the NTN dormant state. For an embodiment, this includes the base station identifying that the wireless device has missed a certain number (threshold number) of paging requests, which indicates that the wireless device may be in the NTN dormant state. For an embodiment, the threshold number of missed paging requests is predetermined and can vary depending on the wireless satellite network and a configuration of the wireless device. For an embodiment, if the base station determines that the wireless device has missed the threshold number of paging requests, the base station identifies a and designates the wireless device to be in the NTN dormant state.

For an embodiment, the base station moves the wireless device to disconnected state when receiving an indication from the core of the wireless satellite network to release the wireless device. For an embodiment, the base station moves the wireless device to the disconnected state when indicated by a third-party application. As described, for an embodiment, there is no data traffic between base station and the wireless device when the wireless device is in the disconnected state.

For an embodiment, the base station is further configured to determine that the wireless device is in the dormant state, including receiving a dormant state indication from a third party indicating the wireless device is moving to the dormant state. For an embodiment, the base station determines if a wireless device is in dormant state based upon previous messaging and signaling attempts with the wireless device, and further based upon a previously received capability support message.

For an embodiment, the base station dynamically changes the paging threshold based upon the network traffic and other conditions. For an embodiment, the paging threshold is adaptively adjusted based on one or more of a history of the wireless device, and importance of the data being communicated, or an application being utilized.

For an embodiment, when in the dormant state the wireless device saves the attach context and network policies specified by a core network of the satellite wireless network. Further, as previously described, the wireless device does not follow a TAU (tracking area update) policy or a PSM (power saving mode) policy specified by a core of the satellite wireless network when in the dormant state. That is, the wireless device follows the TAU policy and the PSM policy when in the active state, but not in the dormant state. For an embodiment, the wireless device saves the attach context and network policies specified by the core of the satellite wireless network when in the dormant state. For an embodiment, the PSM policy requires wireless devices to connect to the base station after a period. However, when the wireless device is in the dormant state, the wireless device need not connect to the base station based on the period defined by the PSM policy.

At least some embodiments further include triggering, by the wireless device, to the dormant state when a terrestrial wireless connection is available to the wireless device. That is, when the wireless device becomes in range the terrestrial wireless network, the wireless device then attaches to the terrestrial wireless network, and therefore, goes into the dormant state relative to the wireless satellite network.

An embodiment further includes retaining, by the base station, a radio resource connection (RRC) for the wireless devices while the wireless device is in the dormant state.

An embodiment further includes the base station configured to receive from the wireless device an indication of whether the wireless device supports the dormant state.

For an embodiment, the base station is further configured to receive from the wireless device changes in the policy of the wireless device for the active state and the dormant state. For example, if the wireless device is in an emergency situation, wireless can inform the base station about its intention to always remain in active state.

Figure 3A:
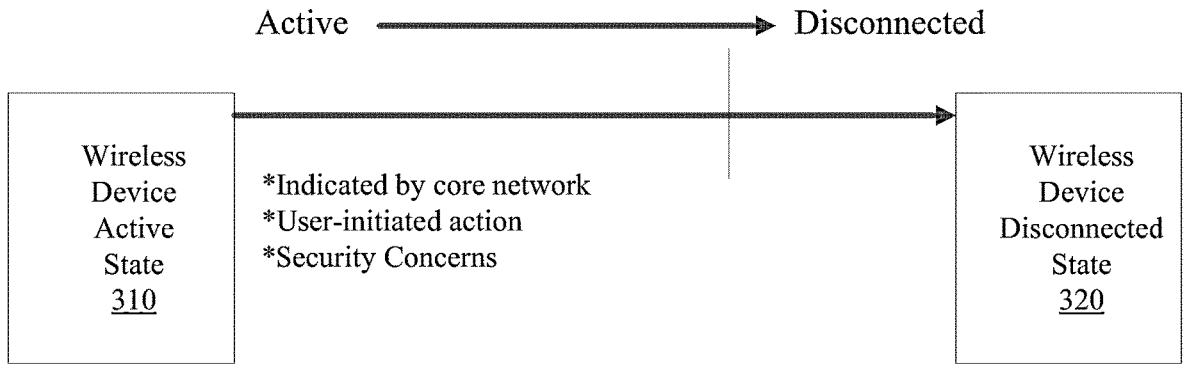
FIGS. 3A, 3B show control of the state of a wireless device by a base station, according to an embodiment.
Figure 3B:
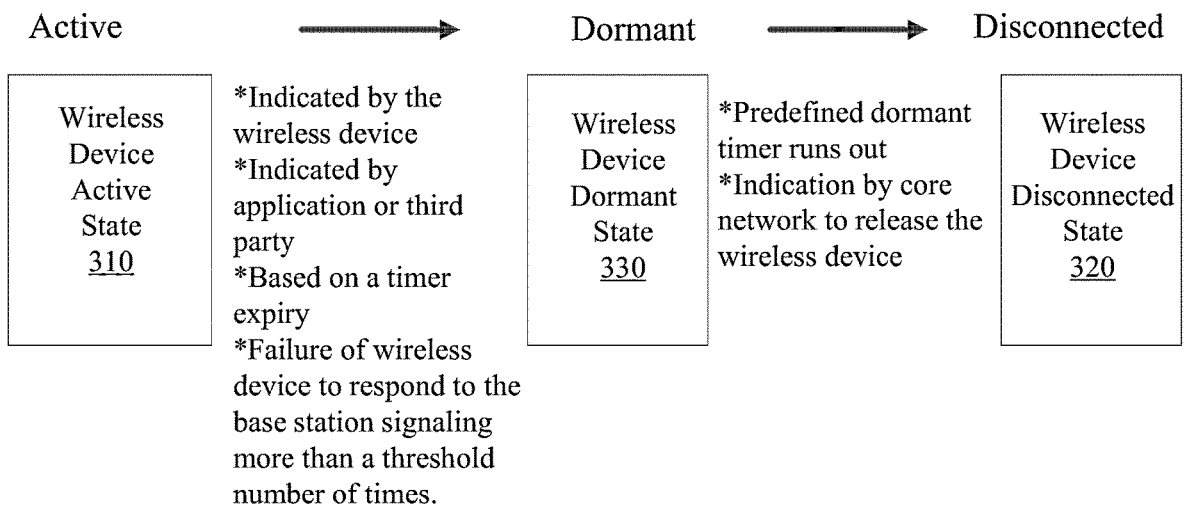

FIGS. 3A, 3B show control of the state of a wireless device by a base station, according to an embodiment. FIG. 3A shows a wireless device transitioning from the active state 310 to the disconnected state 320 for a list of possible reasons. The base station may receive an indication that the wireless device supports the dormant state from the core or from the wireless device. For an embodiment, the FIG. 3B shows the wireless device going from the active state 310, to the dormant state 330, to the disconnected state 320 for a list of possible reasons. FIGS. 3A, 3B show the various conditions used by the base station for state changes of the wireless device in its database from active state 310 to disconnected state 320, and active state 310 to dormant state 330 to disconnected state 320. As can be observed, moving from the active state 310 to the dormant state 330 happens when indicated by the wireless device, or third-party application, or the failure of the wireless device to respond to signaling messages attempted by the base station after a threshold number of paging (signaling) attempts.

As described, for an embodiment, the state of the wireless devices is indicated by an application or a third party. For an embodiment, when the wireless device connects to a terrestrial network or to other satellite networks, then the terrestrial network or the other satellite networks sends an indication to the satellite network. For an embodiment, this indication is used by the satellite network to change the state of the wireless device from the active state to dormant state. For an embodiment, both the wireless device and the satellite network maintain the attach context of the wireless device in this scenario.

For an embodiment, the application server provides the indication to the wireless satellite network which is used by the base station to move the device from the active state to the dormant state. For an embodiment, the application server sends downlink data to the wireless device through one or more of possible available interfaces, such as, the internet using wireless satellite network. For an embodiment, if the application server is able to send data successfully through other interfaces, then the application server can send an indication to the wireless satellite network.

Figure 4:
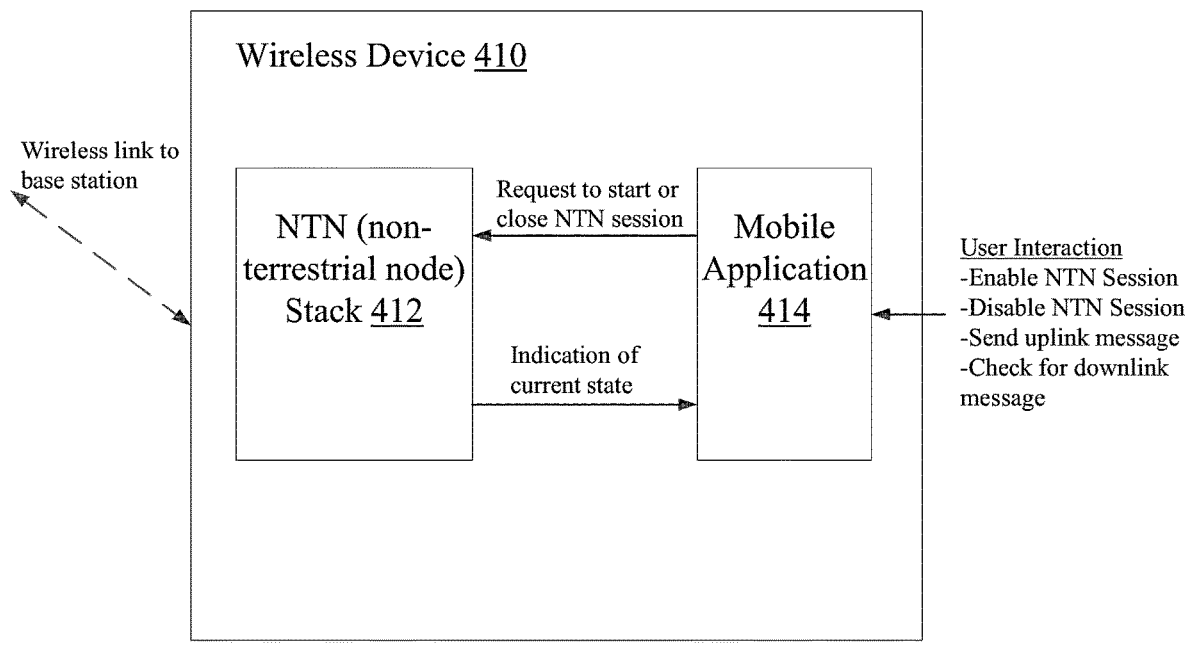
FIG. 4 shows a wireless device that includes user control of states of the wireless device, according to an embodiment.

FIG. 4 shows a wireless device 410 that includes user control of states of the wireless device, according to an embodiment. As shown, the wireless device 410 may include a mobile application 414 and an NTN (non-terrestrial node) stack 412. For an embodiment, the mobile application can receive user actions, such as, enable or disable an NTN session (non-terrestrial network) session. Further the user may input a send uplink message or a check for downlink message.

For an embodiment, the mobile application 414 of FIG. 4 is configured to allow a user to interact and perform activities. For an embodiment, the NTN (non-terrestrial node) stack 412 is included within a modem of the wireless device 410. For an embodiment, an interface between the mobile application 414 and NTN stack 412 leads to activation of an NTN session, deactivation of the NTN session, and message and signaling exchanges. For an embodiment, an NTN session includes a wireless connection to the wireless satellite network. For an embodiment, the user interactions can include enabling NTN sessions via toggles or applications and vice versa, and the user actions can be used to disable NTN sessions. For an embodiment, the interactions also include sending an uplink message which triggers a request to the NTN stack to enable services. For an embodiment, the user interaction also includes requesting the wireless device 410 to check for downlink messages also known as 'DL check-in'. For an embodiment, when receiving the request for UL msg or DL check-in, NTN stack 412 scans for the wireless satellite network and moves the wireless device 410 from the dormant state to active state. For an embodiment, in the active state the wireless device 410 establishes connection to the wireless satellite network and sends either the uplink data and a DL ping msg to the base station.

For an embodiment, on receiving the DL ping message from the wireless device 410, base station moves the wireless device 410 from the dormant state to the active state and sends buffered data to the wireless device. For an embodiment, the base station also sends a state change notification of the wireless device 410 to the application server.

Figure 5:
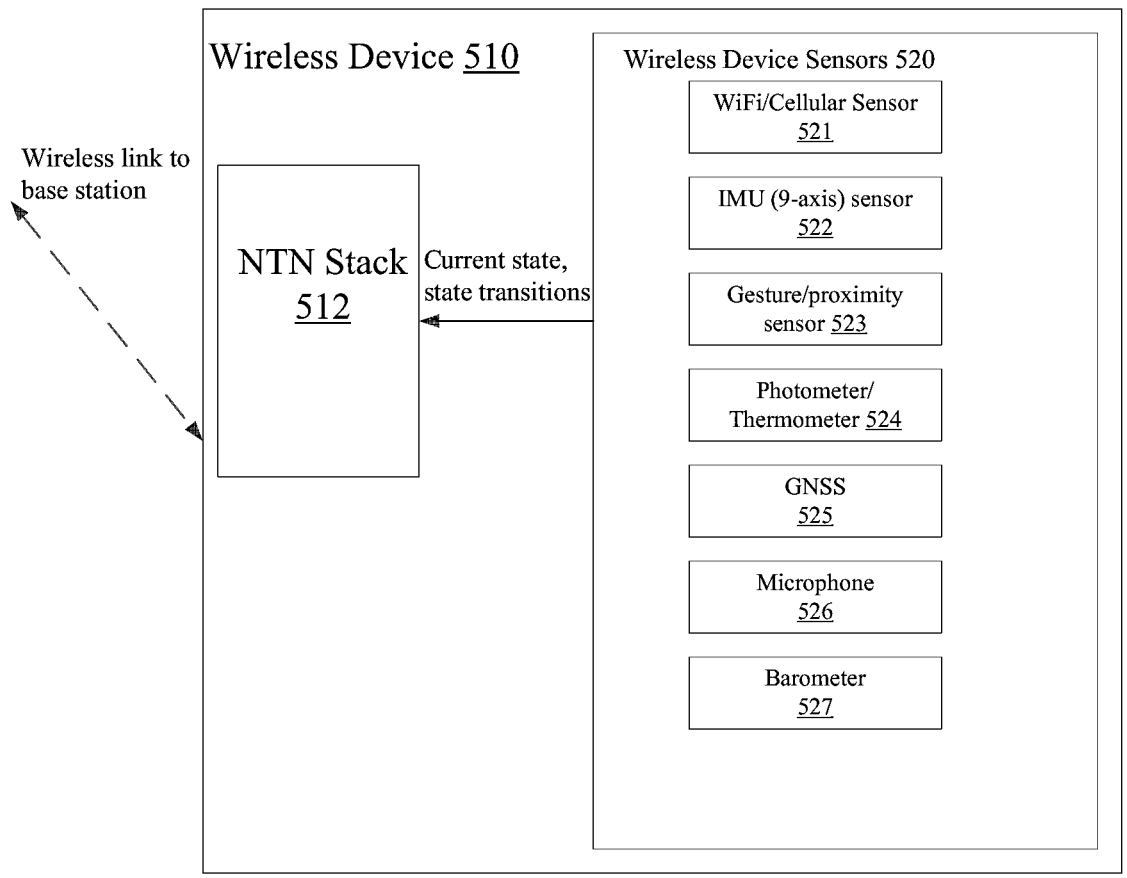
FIG. 5 shows a wireless device that includes sensor control of states of the wireless device, according to an embodiment.

FIG. 5 shows a wireless device 510 that includes sensor control of states of the wireless device, according to an embodiment. As shown, for an embodiment, the wireless device 510 includes wireless device sensors 520, such as, a WiFi/Cellular sensor 521, a 9-axis IMU sensor 522, a gesture/proximity sensor 523, a photometer/thermometer sensor 524, a GNSS (global navigation satellite system) sensor 525, a microphone 526, and/or a barometer 527. For an embodiment, one one or more, or a combination of sensor sensed conditions are provided to an NTN stack 512, and the current state of the wireless device 510 can be transitioned into a new state based on the sensor sensed conditions.

As shown, for an embodiment, the wireless device can have a multitude of sensors like the IMU 522, a Wifi network transceiver, a cellular network transceiver, the gesture sensor 523, the photometric 524, a GNSS receiver, the microphone 526, the barometer 527, etc. For an embodiment, these sensors provide information about the current statistics of the wireless device (for example, a phone) and if these statistics change. For an embodiment, the monitoring of these sensor data and transition from one stable state to another helps in providing switching mechanisms from active state to dormant state and dormant state to active state.

For an embodiment, when the wireless device is in presence of a Wifi/Cellular network, the wireless device moves from active state to dormant state so as to utilize the Wifi/Cellular network instead of wireless satellite network.

For an embodiment, for some of the wireless devices, their ability to connect to the satellite network depends upon the location orientation of the wireless device. For example, when the wireless device is indoor where satellite signal strength is very weak and the wireless device is not serving an emergency session, the wireless device can go to the dormant state to save power of the wireless device.

For at least some embodiments, the wireless device may utilize other information available to the wireless device to trigger state changes. For example, the wireless device may have access to time (clock) and weather information that may influence a state change decision. For example, photometer sensor data, together with a current location and time of the wireless device can be used to detect whether a device moved from outdoor to indoor, which can then be used to change the state of the wireless device.

For an embodiment, if a device is serving an emergency session, the wireless device can remain an active state session for a longer duration. In emergency scenarios when a device is in active state, if the device loses satellite signal, the wireless device may keep periodically searching for satellite signal and can send a tracking area update (TAU) message or DL (downlink) ping message to the base station when the satellite signal strength improves. For an embodiment, wireless satellite networks can use the message received from the wireless device to confirm that the device is in active state in its database. For an embodiment, a user of the wireless device can provide the indication that the wireless device is in the emergency state. For an embodiment, this indication can be initiated by voice activation at the wireless device. For at least some embodiments, gesture and proximity sensors within the wireless device can detect when a user is lifting the wireless device (for example, a phone) or moving the wireless device close to the car. This can be used as an indication to move to the dormant state when the wireless device is not supposed to use NTN session in that wireless device orientation.

Figure 6A:
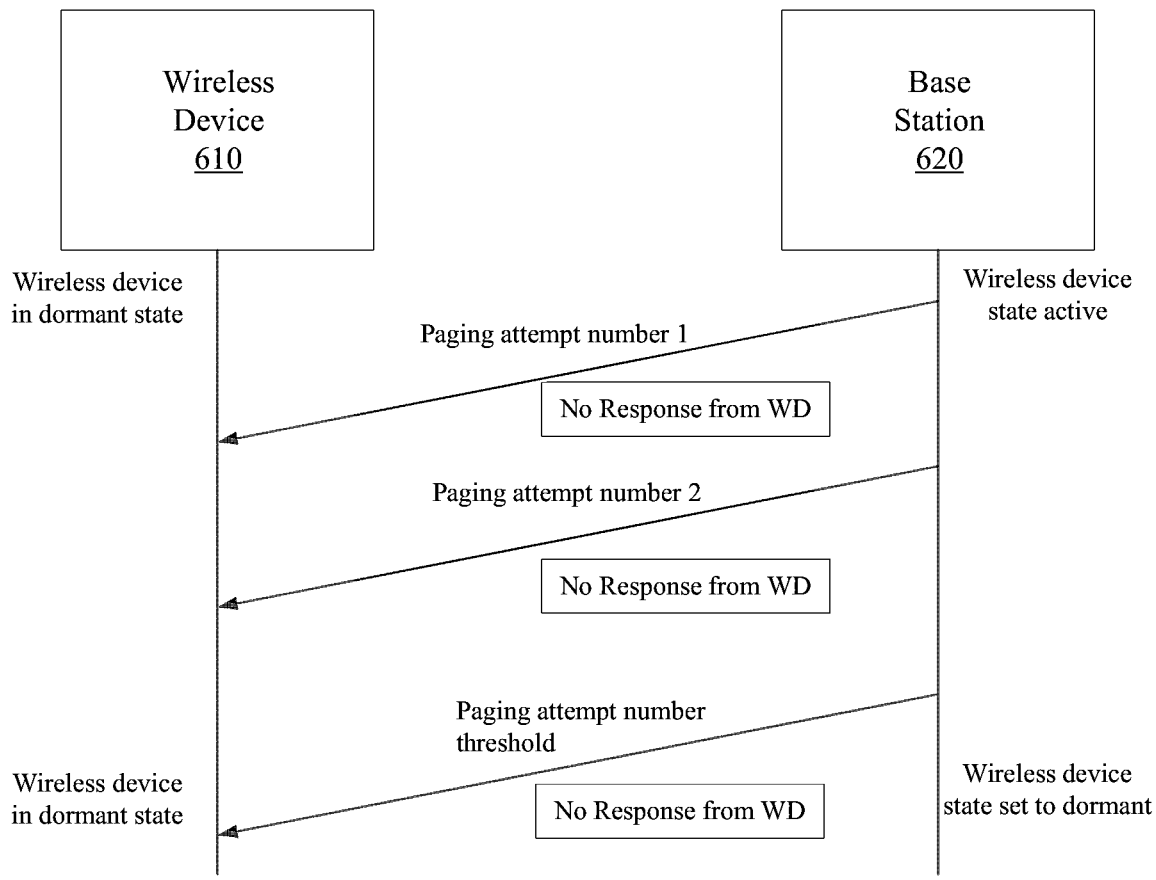
FIG. 6A shows control of the states of a wireless device through signaling attempts to the wireless device, according to an embodiment.

FIG. 6A shows control of the states of a wireless device through signaling attempts to the wireless device, according to an embodiment. As shown, the wireless device 610 may be in the dormant state. Further, as shown, the base station 620 can determine that the wireless device 610 is in the dormant state by the base station 620 sending paging signals to the wireless device 610. If the wireless device does not respond after a threshold number of paging signals, the base station 620 can establish that the wireless device 610 is in the dormant state, and the base station 620 can accordingly update the state of the wireless device 610 to the dormant state. FIG. 6A shows paging attempts sent to the wireless device. As shown, the wireless device does respond to a threshold number of paging attempts by the base station 620 and wireless satellite network. After the threshold number of paging attempts, the base station 620 identifies and designates the wireless device 610 as dormant.

Figure 6B:
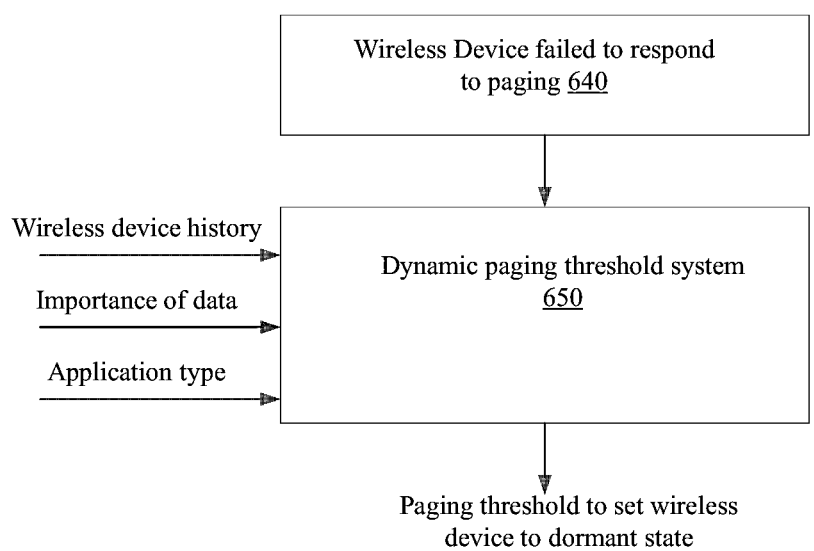
FIG. 6B shows a dynamic paging system, according to an embodiment.

FIG. 6B shows a dynamic paging system, according to an embodiment. As described, for an embodiment, the base station determines whether the wireless device fails to respond to paging 640. For an embodiment, the paging threshold set by the base station to set the wireless device as dormant is dynamically changed by a dynamic paging threshold system 650. For an embodiment, the paging threshold is changed based on one or more of the wireless history, importance of data, application type of the wireless device. For an embodiment, the wireless device can be of various classes and categories. These categories can be based on the application that the wireless device is trying to perform.

For an embodiment, wireless devices classified as IoT (internet of things) devices and mobile user equipment are designated as two different categories. For an embodiment, for IoT classified wireless devices, the paging threshold can be low based upon the quality of service and latency requirements. For an embodiment, important updates for IoT devices have a higher paging threshold as well.

For an embodiment, mobile and stationary wireless devices are also different categories. For an embodiment, for mobile devices the paging threshold can be higher compared to stationary devices since the chances of the wireless device moving in and out of coverage is high. For stationary devices, the paging threshold can be low.

For an embodiment, if the downlink data is from an emergency response server or if a wireless device is enabled for emergency use cases, these wireless devices can have a higher paging threshold since the data importance is very high. For an embodiment, the satellite network can also adapt the duration between paging attempts.

Figure 7:
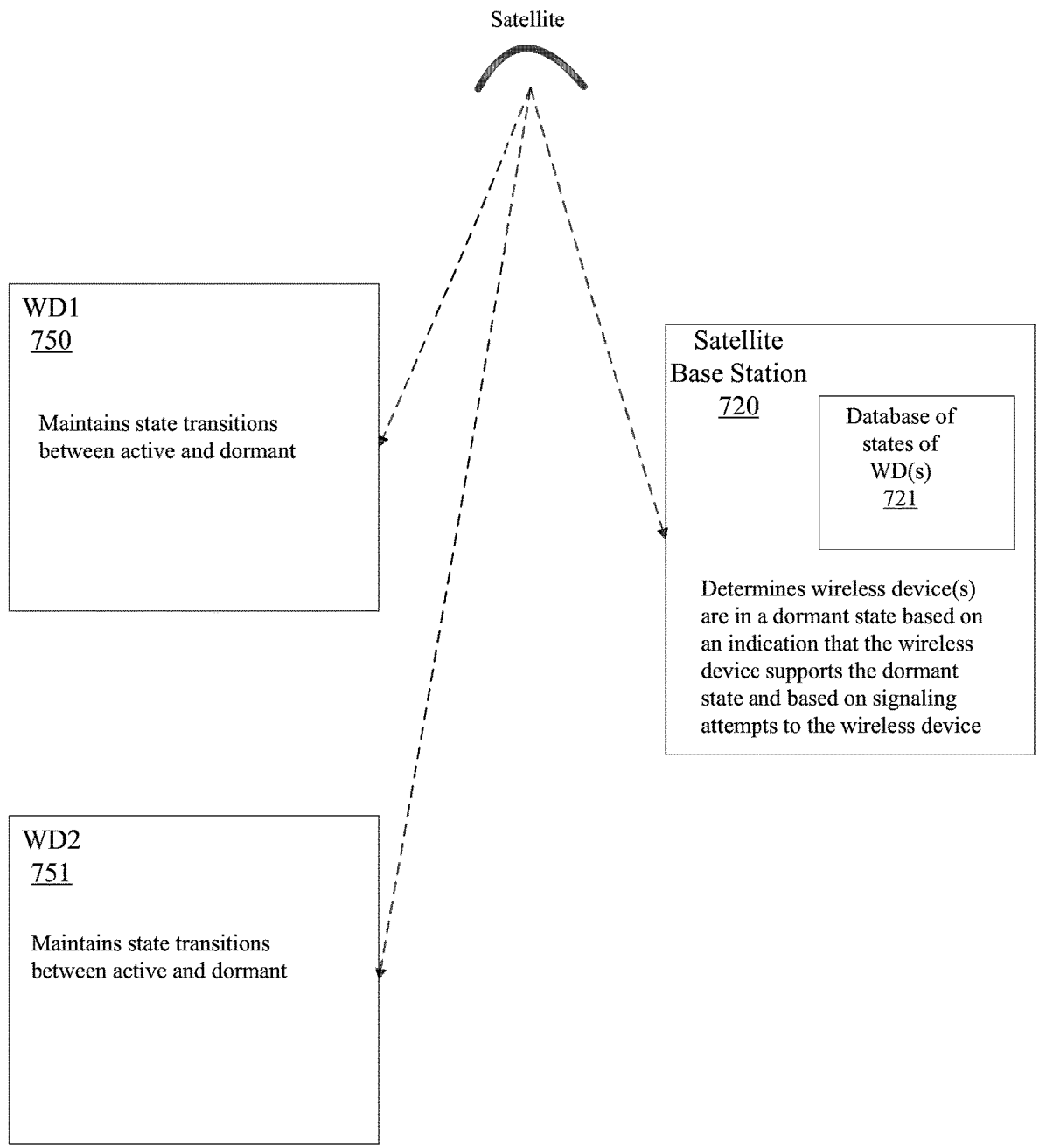
FIG. 7 shows a wireless satellite network that includes a base station managing the states of multiple wireless devices, according to an embodiment.

FIG. 7 shows a wireless satellite network that includes a base station 720 managing the states of multiple wireless devices 750, 751, according to an embodiment. For an embodiment, the base station 720 maintains a database 721 of the current state of the multiple wireless devices 750, 751. FIG. 7 shows how data is managed in different states. For an embodiment, in the dormant state (more data than in the active or dormant state) the data is stored in the buffer. For an embodiment, if the wireless device is moved to the disconnected state, the buffered data is cleared from the buffer.

Figure 8:
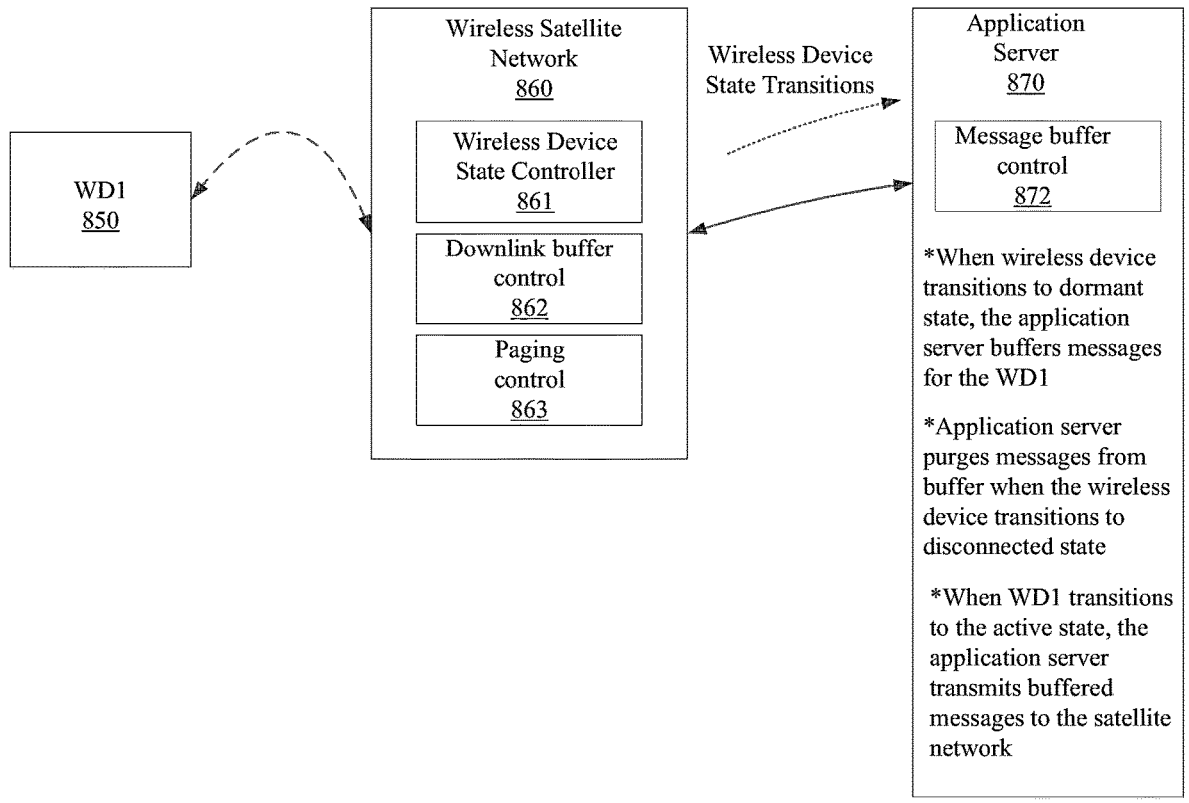
FIG. 8 shows a wireless satellite network that includes buffering controlled by the states of a wireless device, according to an embodiment.

FIG. 8 shows a wireless satellite network 860 that includes buffering controlled by the states of a wireless device 850, according to an embodiment. As shown, the wireless satellite network 860 is connected to an application server 870. For an embodiment, the wireless satellite network 860 includes a wireless device state controller 861, a downlink buffer control 862, and a paging control 863. Further, for an embodiment, the application server 870 includes a message buffer control 872. As previously described, for an embodiment, messages for the wireless device 850 may be buffered when the wireless device 850 is in the dormant state. The buffering can occur within the wireless satellite network 860 and/or at the application server.

For an embodiment, the application server 870 includes software that acts as an interface between user data, mobile application and internet. For an embodiment, the application server is configured to buffer the data when the wireless is in dormant state.

For an embodiment, when there is downlink data for the wireless device 850 which is currently in a dormant state, the application server 870 will buffer the downlink data. For an embodiment, there is another smaller buffer at the base station, and the core of the wireless satellite network can buffer important downlink data for the wireless device. Once the wireless device 850 transitions back to active state from the dormant state, the base station and core, and application processor/server can send the downlink data (including the buffered data) to the wireless device 850.

Figure 9:
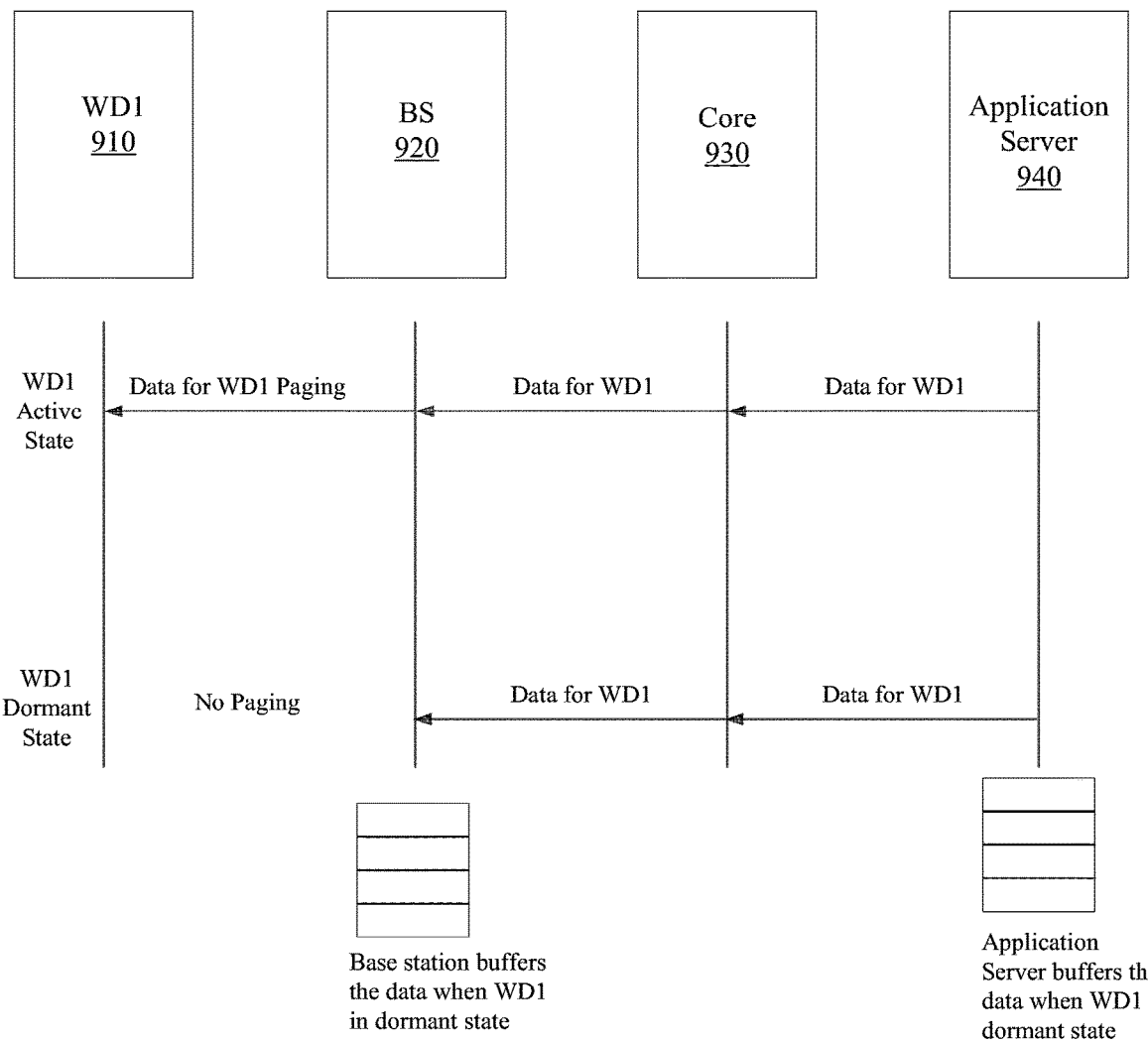
FIG. 9 shows a wireless satellite network depicting paging and buffering at different components of the wireless satellite network for different states of the wireless device, according to an embodiment.

FIG. 9 shows a wireless satellite network depicting paging and buffering at different components of the wireless satellite network for different states of the wireless device, according to an embodiment. As shown, for an embodiment, data for the WD1 910 flows from an application server 940, to the core 930, to the base station 920. If the WD1 910 is in the active state, then the data for the WD1 is communicated via paging to the WD1 910. However, if the WD1 is in the dormant state, then the application server 940 and/or the base station 920 may buffer the data. Further, when the WD1 is in the dormant state, the base station ceases to transmit paging signals to the WD1.

Figure 10:
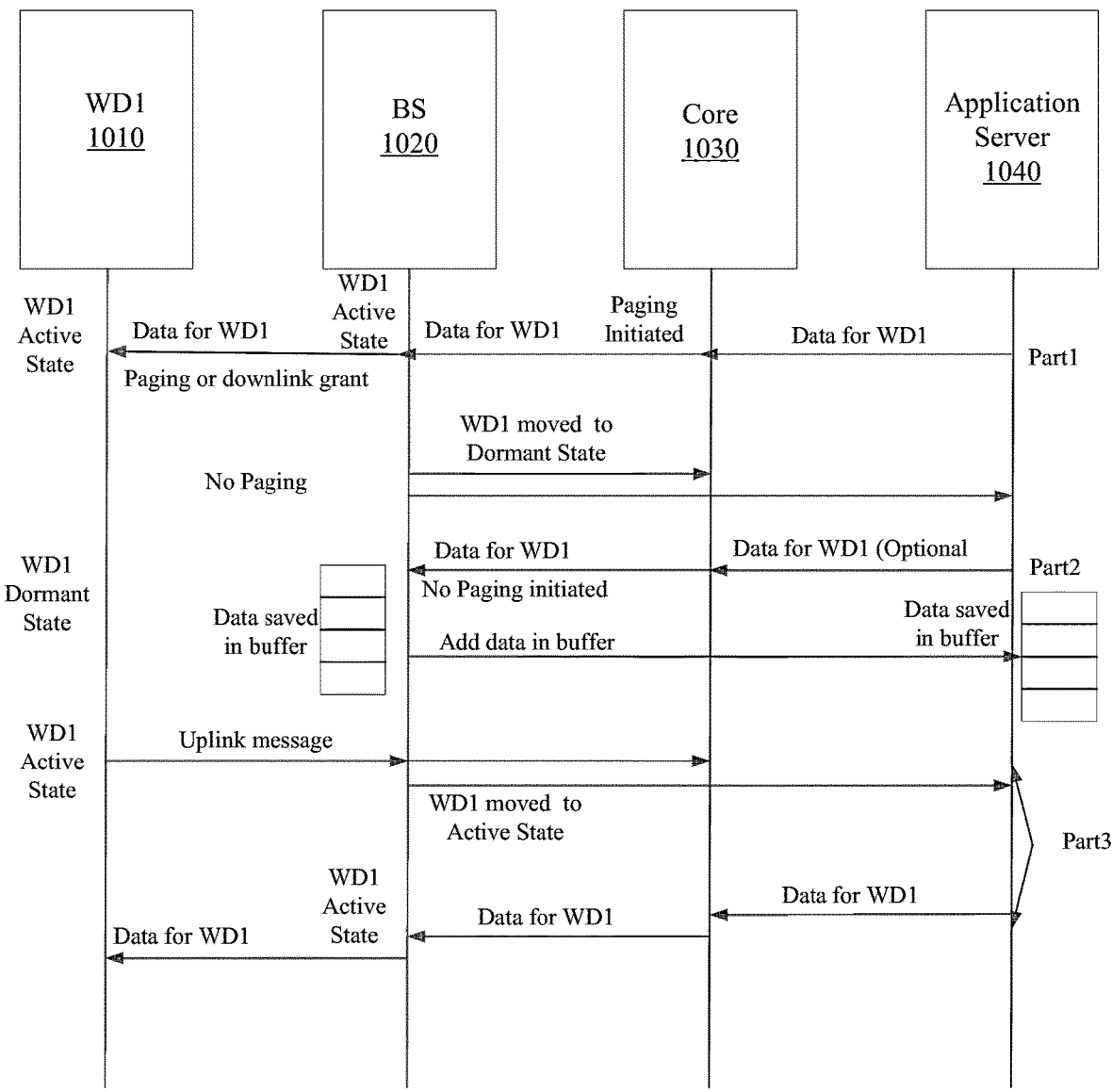
FIG. 10 shows a wireless satellite network depicting paging and buffering at different components of the wireless satellite network for different states of the wireless device, according to another embodiment.

FIG. 10 shows a wireless satellite network depicting paging and buffering at different components (base station 1020, core 1030, application server 1040) of the wireless satellite network for different states of the wireless device 1010, according to another embodiment. FIG. 10 shows operations a wireless satellite network performs in the active state and the dormant state. The first part (Part1) shows the wireless device 1010 in the active state. As shown, when data comes in from the application server 1040, the core 1030 initiates paging for the wireless device 1010, and the base station 1020 upon the trigger from core 1030 sends the paging message to the wireless device 1010. The second part (Part2) of FIG. 10 shows what happens when the wireless device 1010 is moved to the dormant state. In the dormant state, when the application server 1040 receives data for wireless device 1010, the application server 1040 buffers the data and it can indicate to the core 1030 and base station 1020 about new data for the wireless device 1010. The base station 1020 can also buffer some important data on the core 1030. The third part (Part3) shows the movement of the wireless device 1010 from dormant state to active state. Here, the wireless device 1010 sends an uplink message which leads the base station 1020 to move the wireless device 1010 from the dormant state to the active state. After moving to the active state, the buffered messages are sent to the wireless device. The upcoming messages (data) for this wireless device are not buffered and sent to the device via paging or direct data transmissions as long as the wireless device 1010 stays in the connected state.

Figure 11:
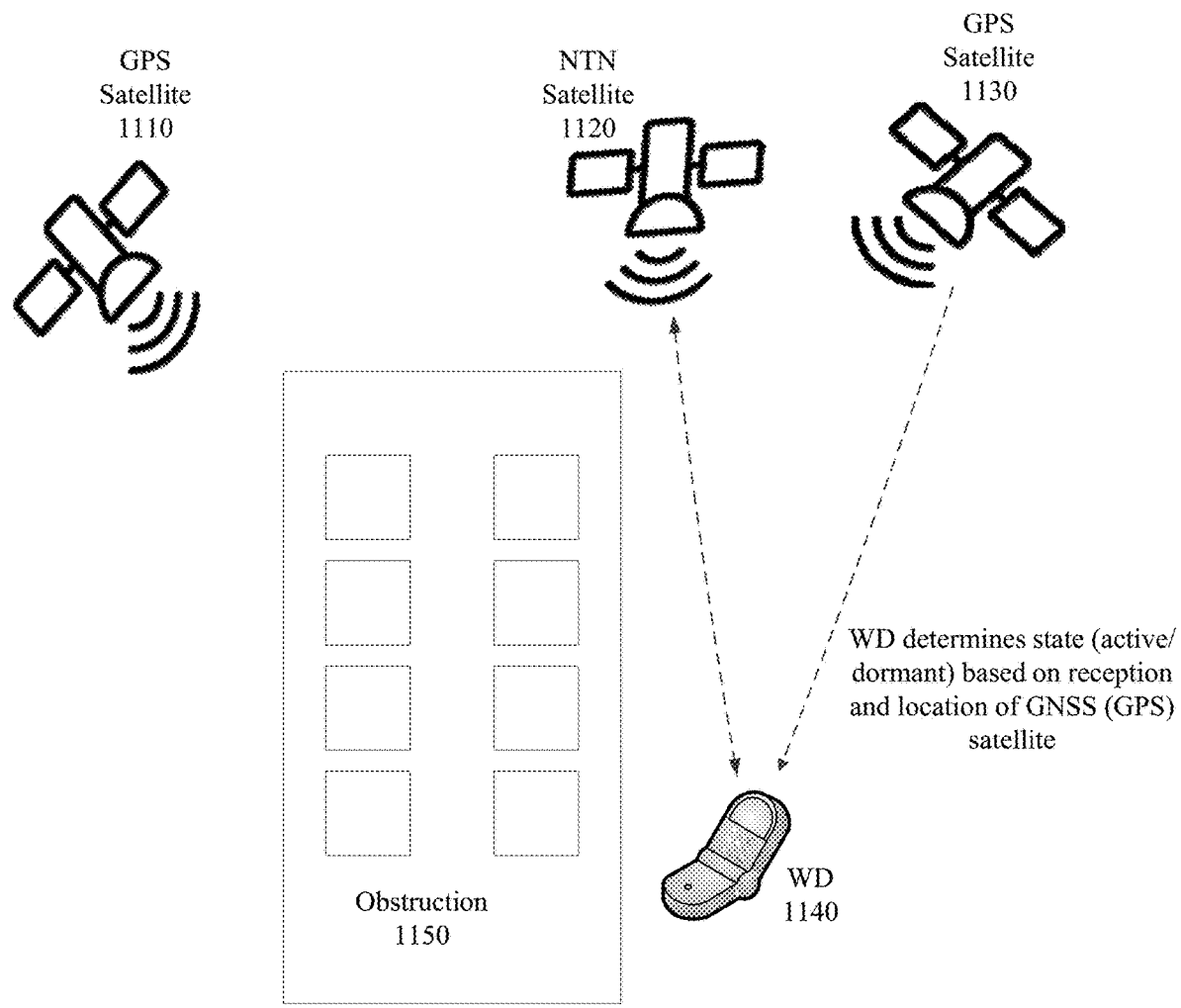
FIG. 11 shows a wireless device in which states of the wireless device are controlled by reception signals from navigational satellites, according to an embodiment.

FIG. 11 shows a wireless device 1140 in which states of the wireless device 1140 are controlled by reception signals from navigational satellites 1110, 1130, according to an embodiment. For an embodiment, the wireless device 1140 may transition from the dormant state to the active state based on the reception of signals from one or more navigation satellites 1110, 1130 which indicate that the WD 1140 may be outdoors. Further, based on knowledge of which navigation satellites 1110, 1130 the WD 1140 is receiving, the wireless device can identify when the WD 1140 has a direct (line-of-sight) link with an NTN satellite 1120 of a wireless satellite network which is not obstructed by an obstruction 1150 additionally based on the ephemeris information of the wireless satellite network. Based on the locations and orientations of the NTN satellite 1120 and the locations and orientations of the navigation satellites 1110, 1130, the WD 1140 may be put in the dormant state or the active state.

Figure 12:
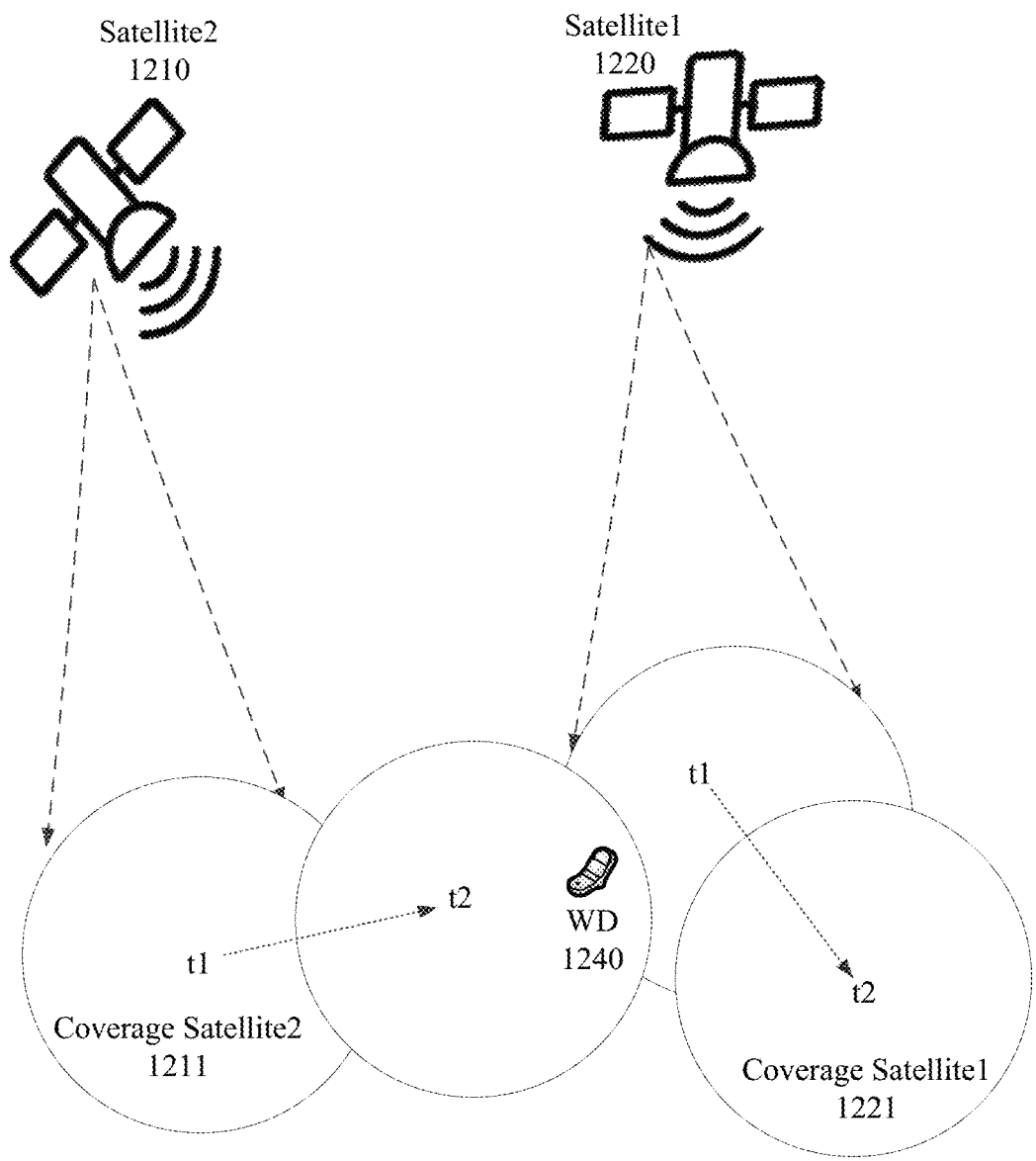
FIG. 12 shows a wireless device that transitions to wireless connections through a first satellite and a second satellite over time, according to an embodiment.
Figure 12:
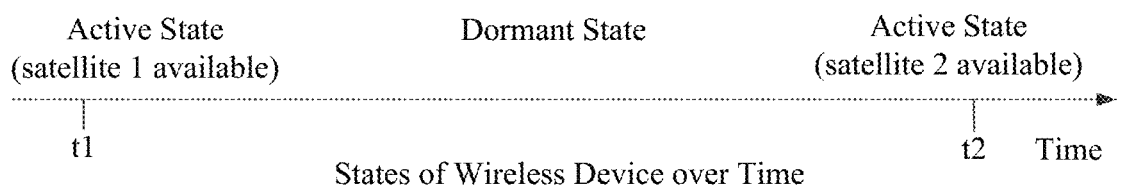

FIG. 12 shows a wireless device 1240 that transitions to wireless connections through a first satellite 1220 and a second satellite 1210 over time, according to an embodiment. As previously described, for an embodiment, the wireless device may enter or exit a dormant state based upon the ephemeris information of the communication satellite the network is using. Further, for an embodiment the wireless device may go into a dormant state when no satellites are available and may leave a dormant state when a satellite is available. For an embodiment, the wireless device knows this information apriori based on the ephemeris information of the satellite(s) and the physical location of the wireless device. For an embodiment the base station and core network similarly register a wireless device in the dormant state based upon the satellite ephemeris information and the location of the device. For an embodiment, when the wireless device leaves dormant state, the wireless device begins to scan for the satellite communication network signal over the air.

As shown, as the wireless device (WD) 1240 travels from a coverage area 1211 of the second satellite 1210 to a coverage area 1221 of the first satellite 1220, the wireless device 1240 may go in and out of coverage areas of the wireless satellite network. As shown the coverage areas 1211, 1221 of the satellites may move over time (between time t1 and time t1), and accordingly, the wireless connection of the wireless device may change with time. FIG. 12 includes a timeline that shows, for example, the wireless device 1240 going from an active state when, for example, in coverage area 1221 of satellite 1 1220, to the dormant state when not in either coverage area, to back to the active state when in the coverage area 1211 of satellite 1210.

Although specific embodiments have been described and illustrated, the embodiments are not to be limited to the specific forms or arrangements of parts so described and illustrated. The described embodiments are to only be limited by the claims.

What is claimed:

1. A system for managing an operational state of a wireless device that connects to a satellite wireless network, comprising:

a base station, the base station configured to:

support a wireless connection of the wireless device through a satellite to the satellite wireless network;

determine that the wireless device is in a dormant state based on an indication that the wireless device supports the dormant state and based on signaling attempts to the wireless device; and control information wirelessly communicated to the wireless device based on whether the wireless device is in the dormant state;

wherein control of buffering of the information for the wireless device is additionally based on whether the wireless device is in the dormant state; and wherein the base station is further configured to determine that the wireless device is in the dormant state, including identifying that the base station has missed a threshold number of paging requests from the wireless device.

2. The system of claim 1, wherein the base station receives the indication of whether the wireless device supports the dormant state.

3. The system of claim 1, wherein the base station is further configured to maintain a current state of the wireless device, wherein the current state includes at least one of the dormant state or an active state.

4. The system of claim 1, wherein controlling the information wirelessly communicated to the wireless device includes reduced sending of messages to the wireless device when the wireless device is in the dormant state.

5. The system of claim 1, wherein the buffering of the information for the wireless device when in the dormant state includes buffering downlink data for the wireless device until a state of the wireless devices changes from the dormant state to an active state.

6. The system of claim 3, wherein the base station is further configured to inform an application server when the current state of the wireless device changes.

7. A system for managing an operational state of a wireless device that connects to a satellite wireless network, comprising:

a base station, the base station configured to:

support a wireless connection of the wireless device through a satellite to the satellite wireless network;

determine that the wireless device is in a dormant state based on an indication that the wireless device supports the dormant state and based on signaling attempts to the wireless device; and control information wirelessly communicated to the wireless device based on whether the wireless device is in the dormant state;

wherein control of buffering of the information for the wireless device is additionally based on whether the wireless device is in the dormant state;

wherein the base station is further configured to transition the wireless device to a disconnected state and purge downlink messages when buffering of the information for the wireless device reaches a maximum size threshold.

8. The system of claim 3, wherein the current state of the wireless device is independently maintained on both the wireless device and the base station.

9. The system of claim 3, wherein the wireless device updates the current state of the wireless device based upon sensor data of the wireless device.

10. The system of claim 9, wherein the sensor data includes at least navigational satellite data of a GNSS sensor.

11. The system of claim 10, wherein the wireless device transitions from the dormant state to the active state based on a received signal strength of signals received from GNSS (global navigation satellite system) satellites.

12. The system of claim 10, wherein the wireless device transitions from the dormant state to the active state based on a received signal strength of signals received from GNSS satellites and a position of a satellite servicing the satellite network relative to the position of the wireless device and the GNSS satellites.

13. The system of claim 3, wherein the current state of the wireless device transitions from one state to another state based on interaction of the wireless device with a user of the wireless device.

14. The system of claim 1, wherein the signaling attempts include at least one of paging attempts, DL (downlink) grants, or UL (uplink) grants to the wireless device.

15. The system of claim 1, wherein the wireless satellite network is further configured to maintain an RRC (radio resource control) context of the wireless device when the wireless device is determined to be in the dormant state.

16. The system of claim 1, wherein the satellite wireless network maintains an attach context of the wireless device when the wireless device is determined to be in the dormant state.

17. The system of claim 1, wherein while the wireless device is in the dormant state, the wireless device does not proactively try to receive wireless signals (pages) through a paging channel from the base station.

18. The system of claim 1, wherein while the wireless device is in the dormant state, the wireless device does not transmit periodic TAU (track area update) messages to the base station, and wireless device does send TAU messages while in an active state based on the TAU policy exchanged between a core of the wireless satellite network and wireless device.

19. The system of claim 2, wherein the indication of whether the wireless device supports the dormant state is received from the wireless device or a third party.

20. The system of claim 1, wherein the base station is further configured to determine that the wireless device is in the dormant state, including receiving a dormant state indication from a third party indicating the wireless device is moving to the dormant state.

21. The system of claim 1, wherein when in the dormant state the wireless device saves the attach context and network policies specified by a core of the wireless satellite network.

22. The system of claim 1, wherein when in the dormant state the wireless device does not adhere to a PSM (power saving mode) policy.

23. The system of claim 1, further comprising:

triggering, by the wireless device, to the dormant state when a terrestrial wireless connection is available to the wireless device.

24. The system of claim 1, wherein the base station is further configured to receive from the wireless device an indication of whether the wireless device supports the dormant state.

25. The system of claim 1, wherein the base station is further configured to receive from the wireless device changes in a policy of the wireless device for an active state and the dormant state.

26. A method for managing an operational state of a wireless device that connects to a satellite wireless network, comprising:

supporting, by a base station, a wireless connection of the wireless device through a satellite to the satellite wireless network;

determining that the wireless device is in a dormant state based on an indication that the wireless device supports the dormant state and based on signaling attempts to the wireless device;

controlling, by the base station, information wirelessly communicated to the wireless device based on whether the wireless device is in the dormant state; and buffering of the information for the wireless device based on whether the wireless device is in the dormant state;

further determining, by the base station, that the wireless device is in the dormant state, including identifying that the base station has missed a threshold number of paging requests from the wireless device.

* * * * *